D. A. BIEBINGER.
GUIDE WHEEL.
APPLICATION FILED NOV. 10, 1913.
1,198,516.
Patented Sept. 19, 1916.
3 SHEETS—SHEET 1.
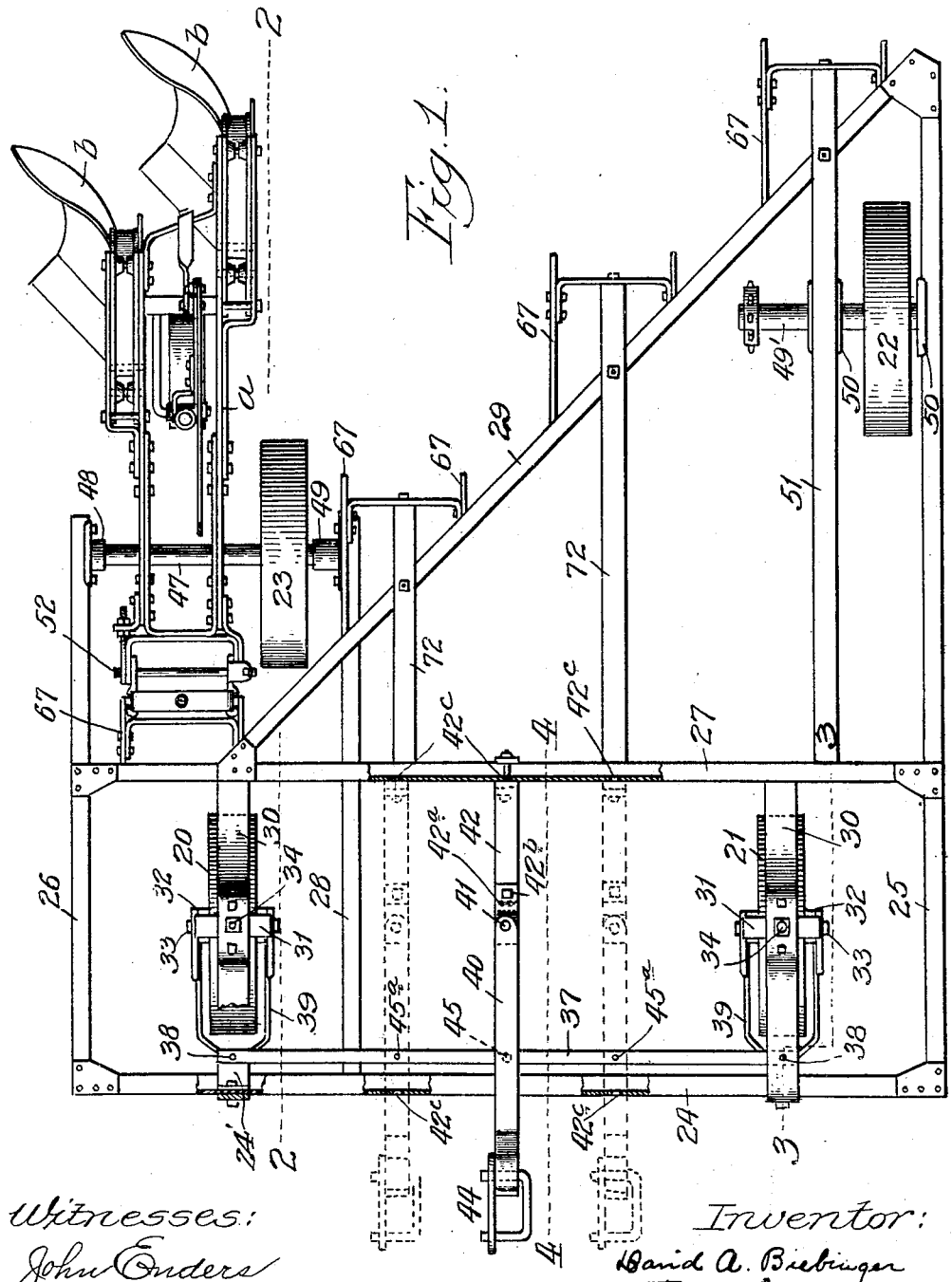

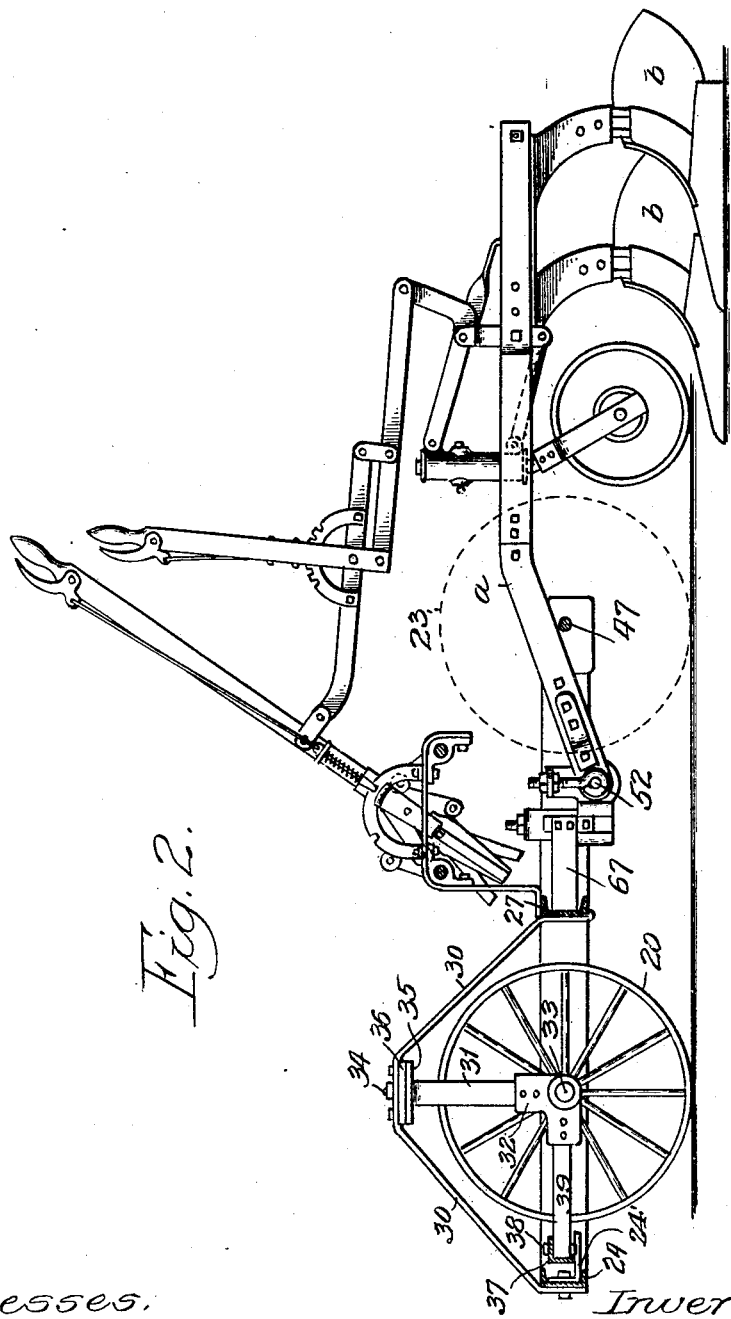

D. A. BIEBINGER.
GUIDE WHEEL.
APPLICATION FILED NOV. 10, 1913.
1,198,516.
Patented Sept. 19, 1916.
3 SHEETS—SHEET 3.
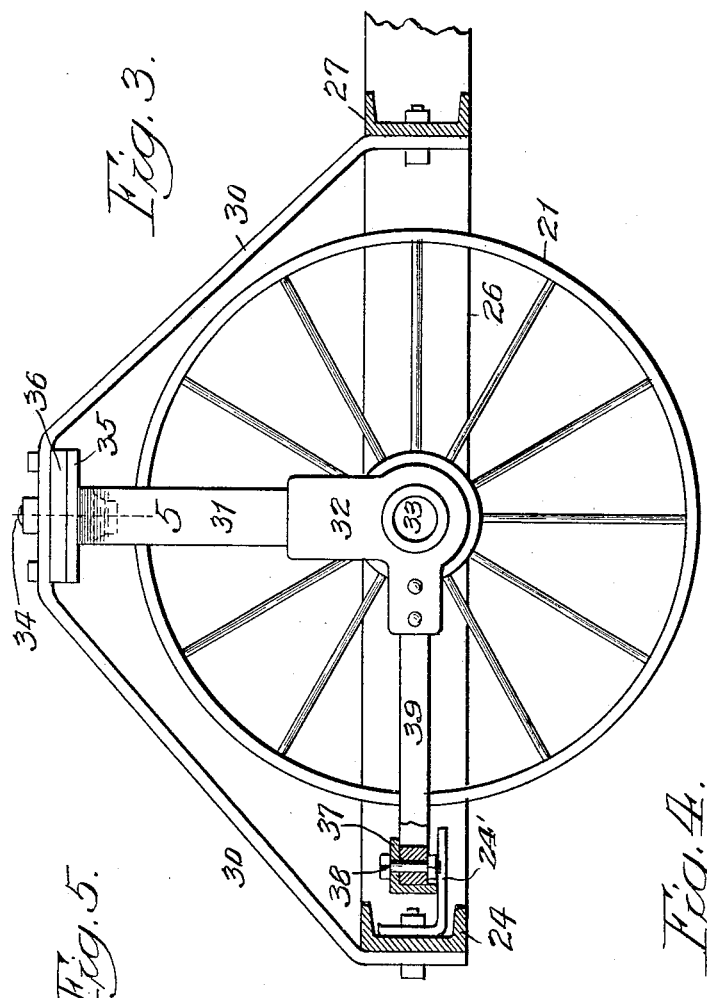
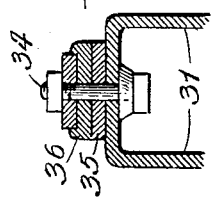
Witnesses:
John Enders
Katharine Gerlach
Inventor:
David A. Biebinger
by Fred Gerlach
his Atty

UNITED STATES PATENT OFFICE.

DAVID A. BIEBINGER, OF MOLINE, ILLINOIS, ASSIGNOR TO LA CROSSE PLOW CO., OF LA CROSSE, WISCONSIN, A CORPORATION OF WISCONSIN.

GUIDE-WHEEL.

1,198,516.  Specification of Letters Patent.  Patented Sept. 19, 1916.

Original application filed August 24, 1912, Serial No. 716,925. Divided and this application filed November 10, 1913. Serial No. 800,056.

*To all whom it may concern:*

Be it known that I, DAVID A. BIEBINGER, a resident of Moline, in the county of Rock Island and State of Illinois, have invented certain new and useful Improvements in Guide-Wheels, of which the following is a full, clear, and exact description.

The invention relates to tractor plows and more particularly to the carrying and guide wheels therefor.

The improvements herein shown are adapted to be applied to a tractor plow of the type shown in my application for Letters Patent Serial No. 716,925, filed August 24, 1912, of which the present application is a division.

One object of the invention is to provide a tractor plow with improved dirigible carrying wheels and one in which provision is made for laterally adjusting the draft link according to the number of plows in use.

The invention consists in the several novel features hereinafter set forth and more particularly defined by claims at the conclusion hereof.

In the drawings: Figure 1 is a plan of a tractor plow embodying the invention, parts being omitted. Fig. 2 is a section taken on line 2—2 of Fig. 1. Fig. 3 is an enlarged section taken on line 3—3 of Fig. 1. Fig. 4 is an enlarged section taken on line 4—4 of Fig. 1. Fig. 5 is a section taken on line 5—5 of Fig. 3.

The improved plow comprises a supporting-frame which is adapted to be hitched to a tractor and to be operated thereby. This supporting-frame is sustained by a pair of dirigible front wheels 20 and 21, which are disposed within the frame, a traction wheel 22 at the rear of one side of the frame, and a fourth wheel 23 at the rear of the other side of the frame. This frame comprises a front channel-bar 24, side bars 25 and 26, a cross bar 27, a longitudinally extending bar 28, and a diagonal rear bar 29 which is secured to the rear of side bar 25 and to cross bar 27. These cross-bars, side bars and diagonal bar, are all rigidly secured together to constitute a supporting frame for the plow-operating mechanism.

Carrying-wheel 23 is mounted upon an axle 47 which is mounted in a bearing bracket 48 which is secured to the rear end of frame-bar 26 and in a bracket 49 which is secured to a bracket 67. Traction-wheel 22 is secured to a shaft 49' which is journaled in bearings 50 which are secured to frame-bar 25 and to a draft-bar 51, respectively.

The frame, carrying-wheels and steering devices are simple in construction, so that excessive weight is avoided. The frame is adapted for operating a number of plow-shares $b$ usually arranged in diagonal succession at the rear thereof. Plow-beams $a$, to which the plow-shares are suitably connected, are each pivoted at their front ends to a pin 52 to permit the beams to be raised or lowered. Each pin 52 is suitably connected to the frame by a bracket 67. A full series of brackets 67, which afford couplings for the plow-beams, have been shown in Fig. 1, but to avoid duplication all but one of the plow-beams $a$ have been omitted. Bars 72 are secured to the diagonal bar 29; brackets 67 and cross-bar 27 to reinforce the diagonal bar and said brackets.

Arches 30 are secured to cross-bars 24 and 27 of the frame and front wheels 20 and 21 are pivotally connected to the tops of said arches, respectively, by forks 31 which are secured to bearings 32 in which the axles 33 of said wheels are journaled. Each fork 31 is pivotally connected to its arch 30 by a pivot-bolt 34 to permit these wheels to turn horizontally and steer the plow, bearing-plates 35 and 36 being interposed between the forks and the arches 30. Wheels 20 and 21 are cross-connected so as to turn in unison, by a bar 37, the ends of which are respectively pivoted as at 38 to the front ends of horizontal forks 39 which are secured to bearings 32. Supporting brackets 24' are secured to the front cross bar 24 of the frame and are extended to underlie and slidably support the cross bar 37, one of these brackets being disposed adjacent each end of the cross bar 37. Bar 37 is disposed to the rear of the front bar 24. A draft-link 40 is connected by a pivot-pin 41 to a draft-bar 42 which is rigidly secured to cross-bars 24 and 27. A brace 43 reinforces this bar and the draft-pin 41 extends through bar 42, brace 43 and brace-strap $42^a$. A bolt $42^b$ secures brace 43, bar 42 and strap $42^a$ together. The front end of link 40 is adapted to be hitched or coupled to a tractor by means of a suitable clevis 44. A pivot-bolt 45 connects the draft-link 40 and the cross-bar 37 so that any lateral draft, such as occurs in turning, will cause draft-link 40 to swing laterally in the direction of the draft, and operate bar 37 laterally to conjointly turn wheels 20 and 21. Bar 42, to which the pivoted draft-bar 40 is connected, is adjustable laterally to positions indicated by dotted lines in Fig. 1. The purpose of this adjustment is to permit the plow to be operated with any desired number of gangs, and to centrally apply the draft to the machine.

If it should be desired to operate the plow without the right-hand gang, bar 42 will be shifted into line with the central gang of the three remaining or to the left of the machine so that the draft upon the plow frame will be central with respect to the gangs. If it is desired to operate the plow without the left-hand gang, bar 42 may be shifted into line with the center of the three remaining gangs, as indicated by dotted lines, Fig. 1, and then the draft will be central with respect to the remaining gangs. Cross-bar 37, which connects the dirigible wheels for conjoint shift, is provided with holes adapted to receive bolt 45 in the different positions in which the draft-link 40 may be adjusted by adjustment of bar 42 in the frame, these holes being indicated at 45ª. Cross-bars 24 and 27 are provided with holes 42ᶜ whereby bar 42 may be secured in these different positions. The plow thus provides dirigible wheels at the front, and means for adjusting the draft link laterally according to the number of plows in use.

The invention is not to be understood as restricted to the details set forth since these may be modified within the scope of the appended claims without departing from the spirit and scope of the invention.

Having thus described my invention, what I claim as new and desire to secure by Letters Patent, is:—

1. In a tractor-plow, the combination of a frame comprising cross bars, a pair of dirigible wheels adjacent the front of and disposed within the frame and between said cross bars, a pivoted cross-connection between said wheels, and a draft-link pivoted to the frame and connected so as to operate the cross-connection and both of said dirigible wheels laterally.

2. In a tractor plow, the combination of a frame comprising cross bars, a pair of dirigible wheels adjacent the front of the frame, a cross-connection between said wheels, a draft bar between said cross bars, means for rigidly and adjustably securing the draft bar to the cross bars so it may be shifted to different positions laterally, and a draft link pivoted to said bar and adjustably connected to the cross-connection.

3. In a tractor plow, the combination of a frame comprising a cross-bar at the front thereof and longitudinal bars, a pair of dirigible wheels behind said front bar, a draft-device pivotally connected to the frame, and a cross-bar pivoted to said draft-device and connected to swing the dirigible wheels laterally, said cross-bar being disposed behind the front bar of the frame.

4. In a plow, the combination of a main frame, a pair of dirigible wheels, longitudinally extending arches over the wheels and secured to the frame, vertically extending forks pivoted to the longitudinal arches, a draft connection and means between the draft connection and the wheels for swinging them laterally.

5. In a plow, the combination of a main frame, a pair of dirigible wheels, longitudinally extending arches over the wheels and secured to the frame, vertically extending forks pivoted to the longitudinal arches, horizontally extending forks connected to the cross arches, a draft connection and means between the draft connection and said horizontally extending forks for swinging the wheels laterally.

6. In a tractor-plow, the combination of a frame, said frame comprising a pair of cross-bars at the front thereof, a pair of dirigible wheels mounted between said bars, means for pivotally connecting said dirigible wheels to the frame, a longitudinal draft bar secured to said cross-bars, and a draft device pivotel to said longitudinal bar and connected to shift said wheels laterally.

7. In a tractor plow, the combination of a frame, said frame comprising a pair of cross-bars at the front thereof, a pair of dirigible wheels mounted between said bars, means for pivotally connecting said dirigible wheels to the frame, a longitudinal bar adjustably secured to said cross-bars, so it may be shifted to different positions laterally, and a draft-device pivoted to said adjustable longitudinal bar and connected to shift said wheels laterally.

DAVID A. BIEBINGER.

Witnesses:
EDWARD L. EAGLE,
F. E. DAVIS.